United States Patent [19]

Satta et al.

[11] Patent Number: 4,941,094
[45] Date of Patent: Jul. 10, 1990

[54] IMAGE RECONSTRUCTION DATA PROCESSING UNIT

[75] Inventors: Yusuke Satta; Yasuro Takiura, both of Tokyo, Japan

[73] Assignee: Yokogawa Medical Systems, Ltd., Tokyo, Japan

[21] Appl. No.: 274,997

[22] PCT Filed: Feb. 19, 1988

[86] PCT No.: PCT/JP88/00169
§ 371 Date: Oct. 12, 1988
§ 102(e) Date: Oct. 12, 1988

[87] PCT Pub. No.: WO88/06321
PCT Pub. Date: Aug. 25, 1988

[30] Foreign Application Priority Data

Feb. 19, 1987 [JP] Japan ................ 62-36600
Feb. 27, 1987 [JP] Japan ................ 62-44327

[51] Int. Cl.$^5$ ............................ G06F 15/40
[52] U.S. Cl. ................ 364/413.21; 378/901
[58] Field of Search ........... 364/413.21, 413.14, 364/413.13, 413.19; 378/901, 54, 56, 2, 19, 27

[56] References Cited

U.S. PATENT DOCUMENTS 4,654,797  3/1987  Fujita et al. .............. 364/413.14
4,680,709  7/1987  Srinivasan et al. ......... 364/413.21
4,803,639  2/1989  Steele et al. .................. 364/507

FOREIGN PATENT DOCUMENTS 296462  12/1986  Japan .

Primary Examiner—Charles E. Atkinson
Assistant Examiner—Kim Thanh Tbui
Attorney, Agent, or Firm—Moonray Kojima

[57] ABSTRACT

An image reconstruction data processing unit of a simple structure which is capable of fast data processing by parallel operations of a plurality of fast processing units (FPU) is provided.

The image reconstruction data processing unit according to the present invention comprises a plurality of FPUs and a single back projection unit (BPU) connected to the formers and is characterized in that the BPU includes a plurality of back projection execution parts corresponding to the FPUs, respectively, and a single pixel memory in which a total sum of output data from the back projection execution parts are stored in a back-projected state.

4 Claims, 3 Drawing Sheets

IMAGE RECONSTRUCTION DATA PROCESSING UNIT

TECHNICAL FIELD

The present invention relates to an image reconstruction data processing unit for a X-ray tomographic apparatus and the like, which is adapted to process data for reconstructing a tomographic image of an object on the basis of data on the object from various directions.

BACKGROUND TECHNOLOGY

As is well known, the X-ray tomographic apparatus is used for forming a tomographic image of an object in such a manner that a number of projection data are collected by applying X-rays at various angles and the collected data are processed for image reconstruction. The data processing by such X-ray tomographic apparatus basically comprises the steps of preprocessing, reconstruction and postprocessing. In the preprocessing step, logarithmic conversions, predetermined corrections including X-ray intensity correction, beam quality hardening correction, scattering correction and etc., and filtering are performed and in the reconstruction step, the operation of back projections is performed by using the preprocessed projection data thereby forming image data indicative of a tomographic image of an object. The image data thus obtained are corrected by the postprocessing step to a form suitable for them to be stored in a recording medium.

As an apparatus for performing the above data processing steps at high speeds, there is employed a data processing unit comprising a combination of a fast processing unit (hereinafter referred to as "FPU") and one or a plurality of back projection units (hereinafter referred to as "BPU"). The FPU is provided with a main memorY for storing projection data and an operation part for preprocessing the projection data, and the BPU is provided with a computing element and an image memory having addresses each corresponding to each of pixels of a reconstruction image. To increase the image reconstruction speed, it is considered to operate a plurality of such data processing units in parallel relationships with one another but in that case, the following problems arise. That is, the data on the reconstruction image must be a total sum of back projection data obtained by each BPU and further, the reconstruction image data must be postprocessed by a desired FPU so that buses for reception and transmission of the back projection data between the BPUs and between the FPUs and BPUs. Consequently, the structure of the data processing unit becomes complicated.

DISCLOSURE OF THE INVENTION

The object of the present invention is to provide an image reconstruction data processing unit which though simple in structure, can perform a fast data processing by parallel operations of a plurality of FPUs.

The data processing unit of the present invention comprises a plurality of FPUs and a single BPU connected to the formers. The BPU is characterized by the provision of a plurality of back projection execution parts and a single pixel memory in which a total sum of output data from the formers is stored in a backprojected state.

BEST MODE FOR WORKING THE INVENTION

Figure 1:
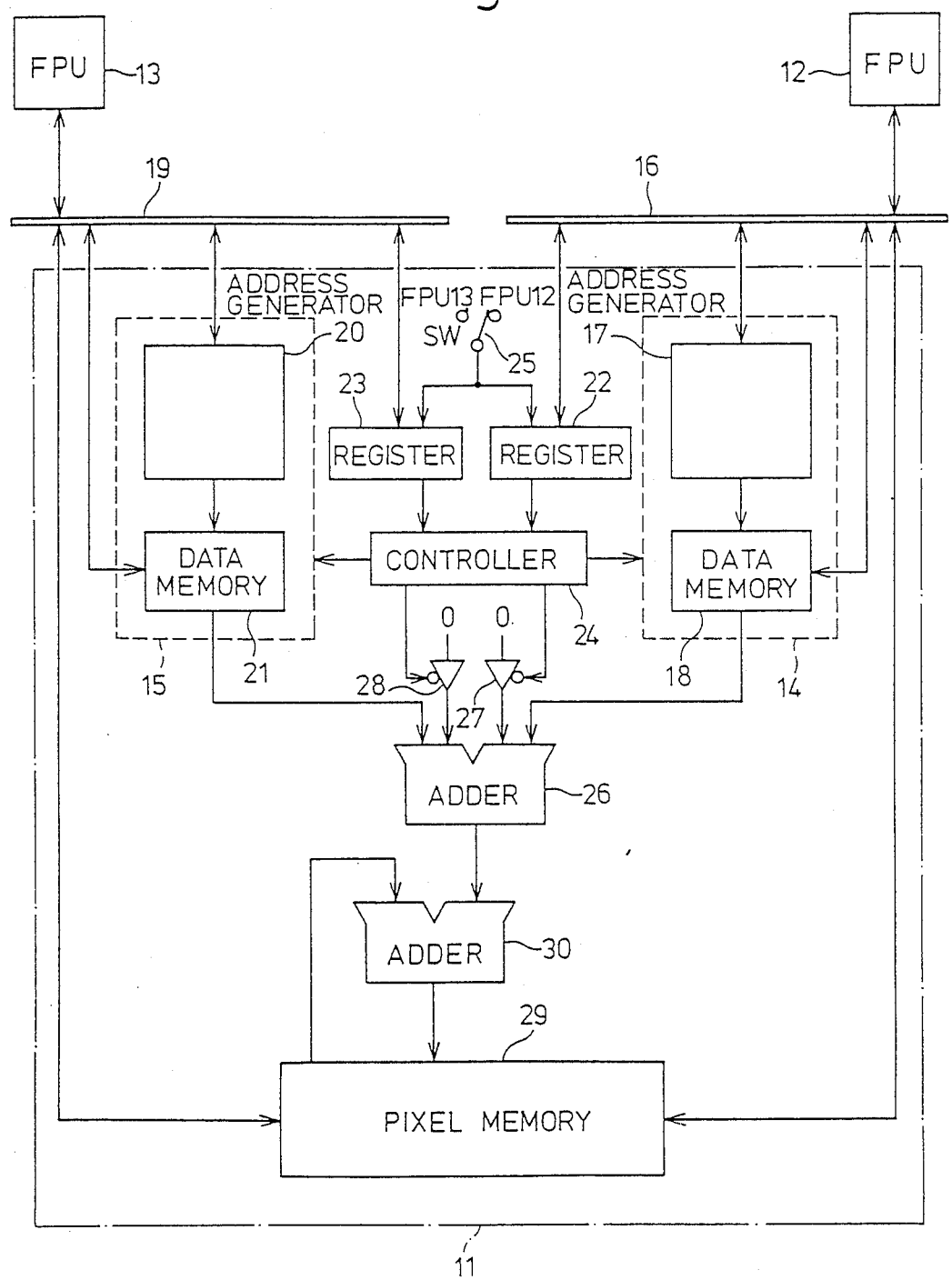
FIG. 1 is a block diagram of one embodiment of the present invention.

The present invention will now be described in detail with reference to the accompanying drawings. In FIG. 1, a single BPU 11 is connected to two FPUs 12 and 13 through general purpose buses 16 and 19. The structure of the BPU is as follows: Two back projection execution parts 14 and 15 are provided so as to correspond to the FPUs 12 and 13. The back projection execution part 14 is provided with an address generating part 17 and a data memory 18 connected to the FPU 12 through the general purpose bus 16, and the back projection execution part 15 is provided with an address generating part 20 and a data memory 21 connected to the FPU 13 through the general purpose bus 19. Further, two registers 22 and 23 are provided in correspondence to the two FPUs, respectively, so as to hold control data from each of the FPUs and transmit the control data to a control part 24. The control data is deemed effective when it comes from the register connected to the FPU selected by a switch 25. The switch 25 is adapted to select either the FPU 12 or 13 which is to become a master control unit and turned on and off manually or automatically in compliance with the FPU which is assigned to be the master control unit. Further, it may be a software switch. The control part 24 generates a control signal to the back projection execution parts 14, 15 and buffers 27, 28. An adder 26 has an input port through which data read from the data memories 18 and 21 and output data from the buffers 27 and 28 ar inputted thereinto and the result of addition of these data is inputted to an adder 30. The buffers 27 and 28 are controlled to become effective or ineffective of their operations and when held effective, generate a data "0" signal. The adder 30 adds data inputted from the adder 26 and data read out from one of addresses of a pixel memory 29 and the result of such addition is stored at the same address. The pixel memory 29 is of the type that stores data on a reconstruction image and has addresses corresponding to those of the pixel memory 29, respectively. Further, the pixel memory 29 has ports connected to the general purpose buses 16 and 19 through which ports accesses from the FPUs 12 and 13 to the pixel memory 29 are made possible.

Figure 2A:
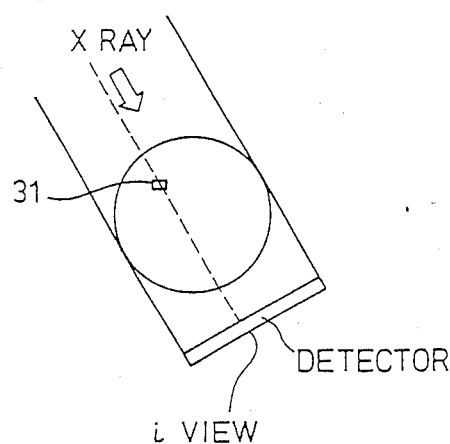
FIGS. 2A and 2B are views illustrating projection data on an object in two directions, respectively.
Figure 2B:
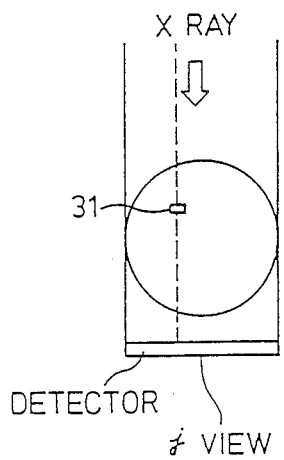

With the above structure, a case in which image reconstruction is performed by the parallel operations of the two FPUs will be described. Now, assuming that the switch 25 is turned to the FPU 12, the control part 24 will control the computation of back projections on the basis of the content of the register 22 with the FPU 12 acting as a master control unit. As the control data from the control part 24 is now indicative of image reconstruction by parallel operations of the two FPUs, the operations of the buffers 27 and 28 are held ineffective so that the adder 26 is in a state in which it is ready to add the output data of the back projection execution part 14 and that of the back projection execution part 15 and generate an output. In this case, if, for example, it is assumed that the FPU 12 writes in the data memory 18 preprocessed projection data corresponding to an i- view shown in FIG. 2, through the general purpose bus 16 and the FPU 13 writes in the data memory 21 preprocessed projection data corresponding to a j-view shown in FIG. 2B, through the general purpose bus 19, then the back projection execution parts 14 and 15 will execute back projections while marking a pixel 31 representing the same portion of the object. That is, the address generating parts 17 and 20 designate to the data memories 18 and 21 addresses at which the projection data on the common pixel of interest in the i-view and j-view are stored and read the projection data corresponding thereto. Then the two kinds of data thus read are added by the adder 26 and after that, the added data are further added to the image data read out from the address in the pixel memorY 29 corresponding to the pixel 31 of interest so as to be rewritten again at the same address, so that the back projection of the pixel 31 is simultaneously performed by the use of the projection data corresponding to the i- and j-views. The above operation is performed throughout all views in sequence with respect to all pixels. That is, the image reconstruction by parallel operations of the two FPUs is performed. In this case, as the back projections are performed with respect to the common pixel memory 29, a reconstructed image is complete in the single pixel memory 29. This means that an image reconstruction data processing unit having a structure simpler than that of the conventional one can be realized by parallel operations of two FPUs. After completing the back projections, the FPUs 12 and 13 are operated parallelly according to necessity so as to perform a postprocessing step by getting access to the common pixel memory 29 through their ports.

As the pixel memorY 29 is common to the FPUs, even when either one of the two FPUs is out of order or disconnected, the image reconstruction process can be performed by the remaining one. Now, assume that the FPU 13 is out of order or disconnected from the beginning. Then the switch 25 may be turned to select the FPU 12 and the control operation of the control part 24 may be regulated according to the content of register 22. In this case, the control information in the register 22 includes information indicative of an independent mode of the FPU 12 so that the output operation of the buffer 28 is held effective through a control based on this information and the buffer 28 generates a "0" signal thereby forcing the left side input of the adder 26 to become zero. Consequently, the output of the adder 26 becomes identical with that of the back projection execution part 14 and is added to the pixel data stored in the pixel memory 29 by the adder 30, thereby enabling back projections to be performed by the single operation of the FPU 12.

Figure 3:
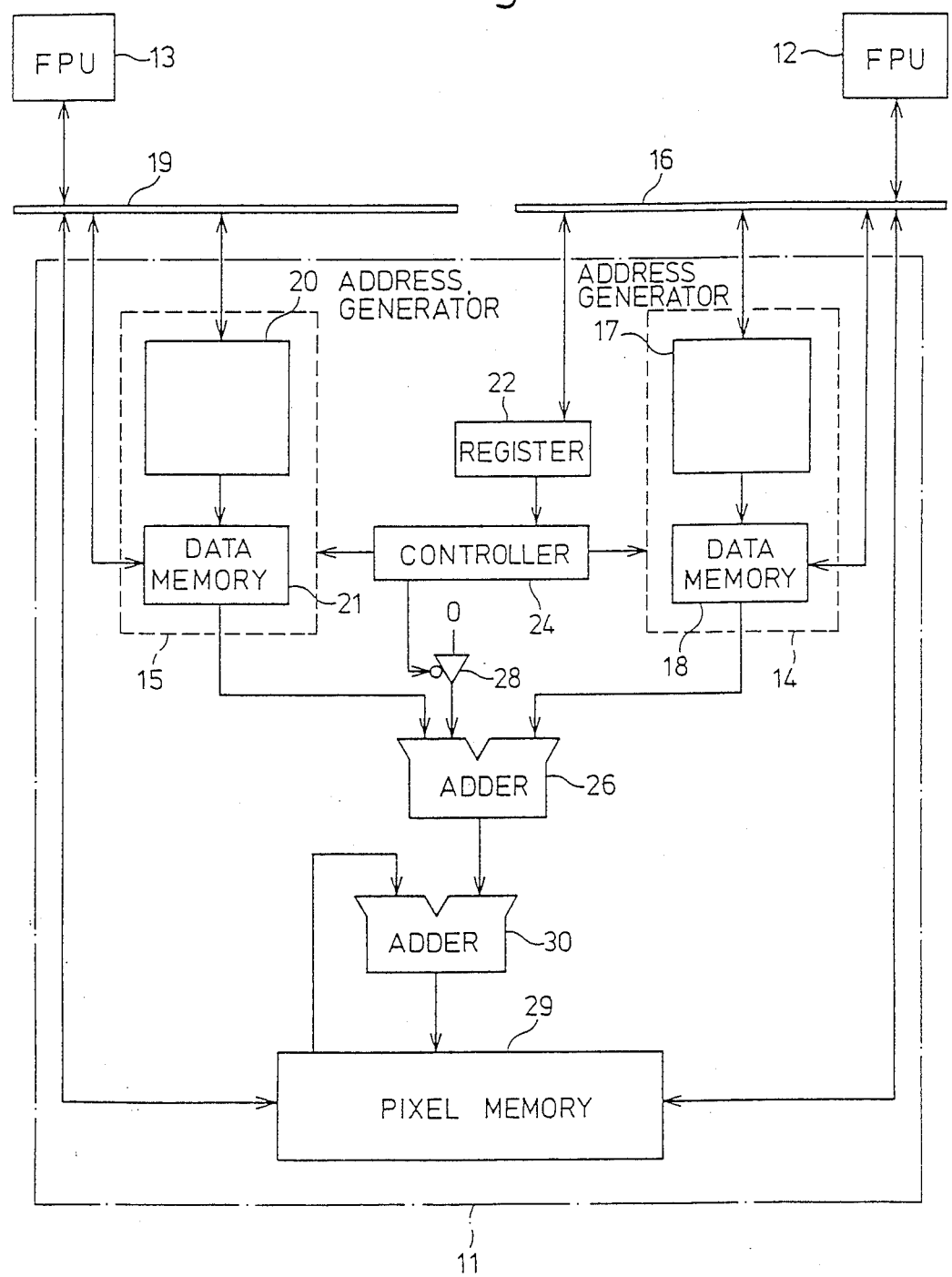

Further, where a master FPU is determined in advance, the structure of the data processing unit may be simplified as shown in FIG. 3 wherein the FPU 12 is determined to be a master unit. However, the image reconstruction by parallel operations of the FPUs 12 and 13 and that by the single operation of the FPU 12 are performed in the same manner as in the case of FIG. 1.

Figure 4:
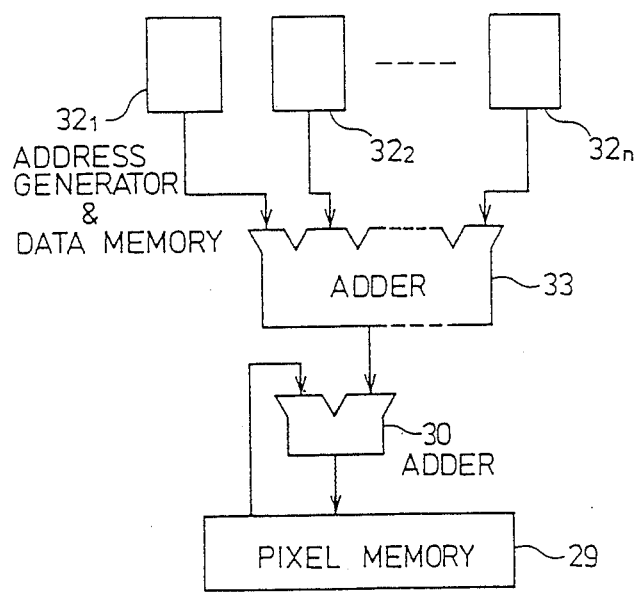
FIGS. 3 and 4 are block diagrams of other embodiments of the present invention.

Although, in the above embodiment, a case using two FPUs has been described, if a data processing unit provided with still more FPUs is desired, the BPU may be constructed as shown in FIG. 4 in which the BPU is provided with n-numbered back projection execution parts $32_1$, $32_2$, ..., $32_n$ corresponding to n-numbered FPUs and an adder 33 having n-numbered input ports.

Although the present invention has been described in its optimum mode for working the present invention, it should be noted that various modifications may be made with ease by a person having ordinary knowledge in the art without departing from the scope of the appended claims.

What is claimed is:

1. An image reconstruction data processing unit comprising
a plurality of fast processing units for providing respective sets of projection data or different views;
a plurality of parts corresponding to said plurality of last processing units back projection execution for extracting from said sets of projection data a desired set of projection data and for generating a first output projection data on a common pixel of interest relative to the extracted desired set of projection data;
a first adder for obtaining a total sum of signals related to said first output projection data and signals related to said sets of projection data, and for generating a second output signal indicative of said total sum;
a pixel memory having addresses corresponding to pixels of a reconstruction image; and
a second adder for adding data read out from an address in said pixel memory corresponding to said common pixel of interest to said second output signal so that image reconstruction is performed by parallel operation of said plurality of fast processing units.

2. An image reconstruction data processing unit according to claim 1, comprising means for selecting one of said fast processing units to be a master control unit.

3. An image reconstruction data processing unit according to claim 1, wherein one of said fast processing units is designated as a master control unit.

4. The image reconstruction data processing unit of claim 1, comprising means for causing all except one of said first output projection data to become zero.

* * * * *